UNITED STATES PATENT OFFICE.

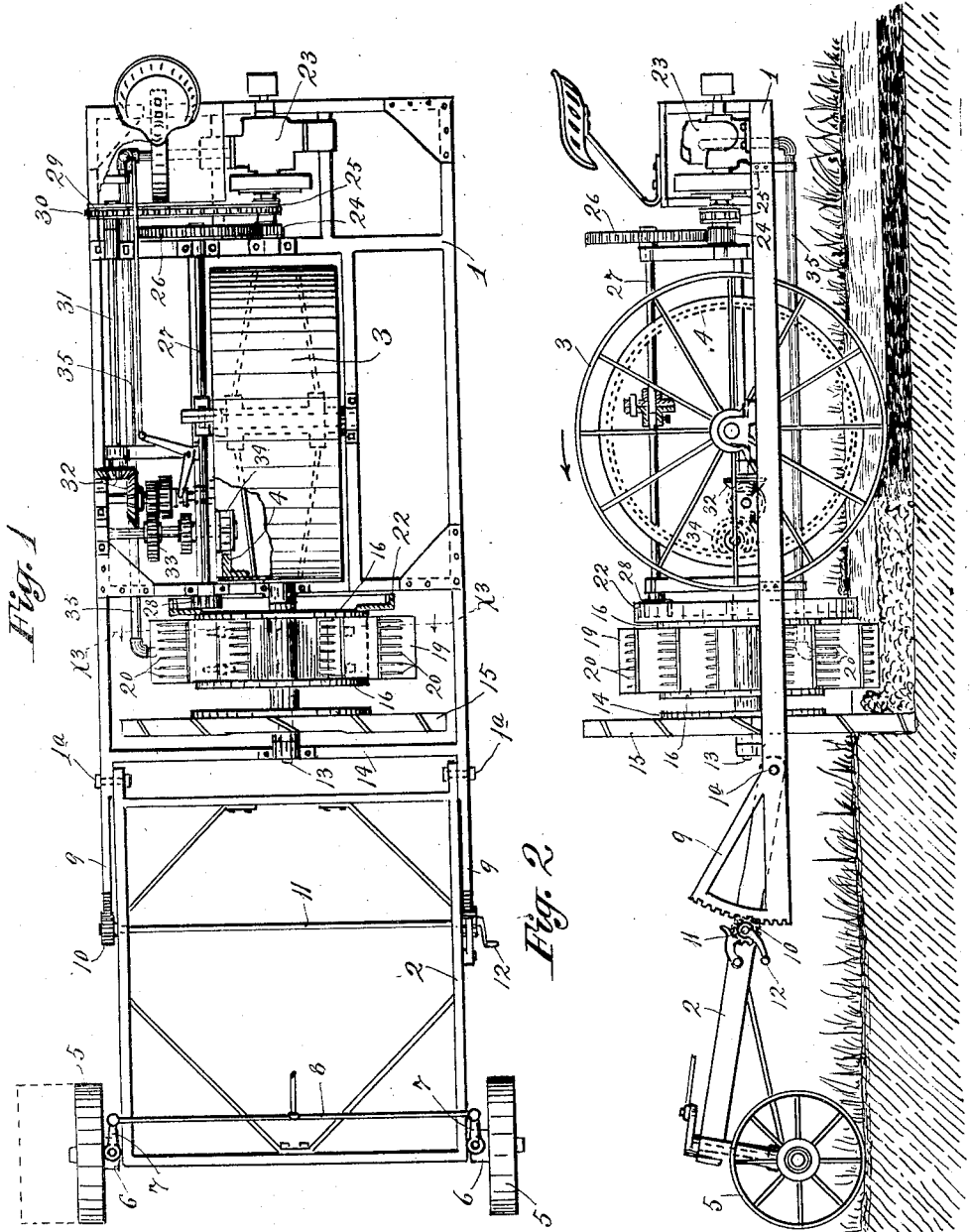

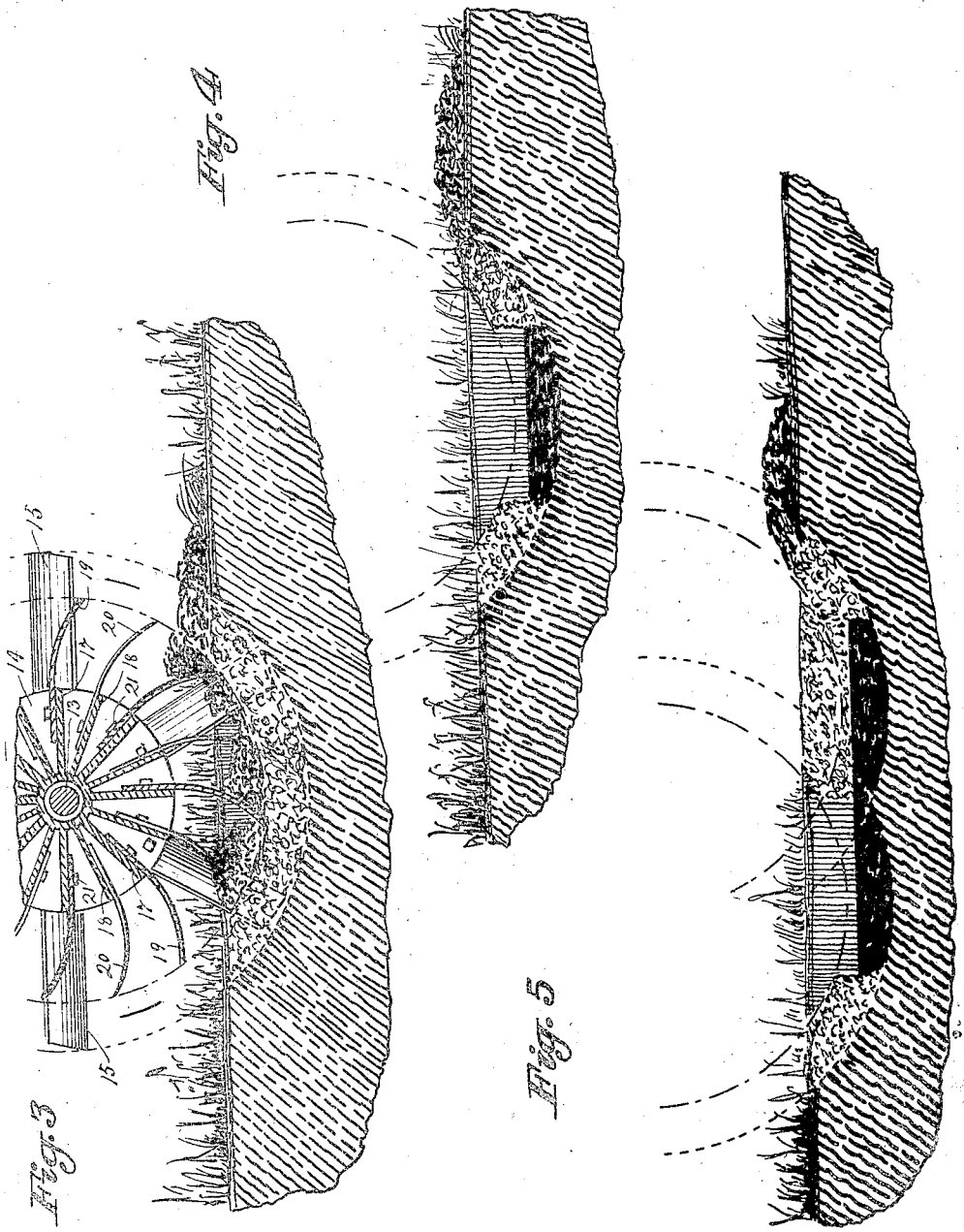

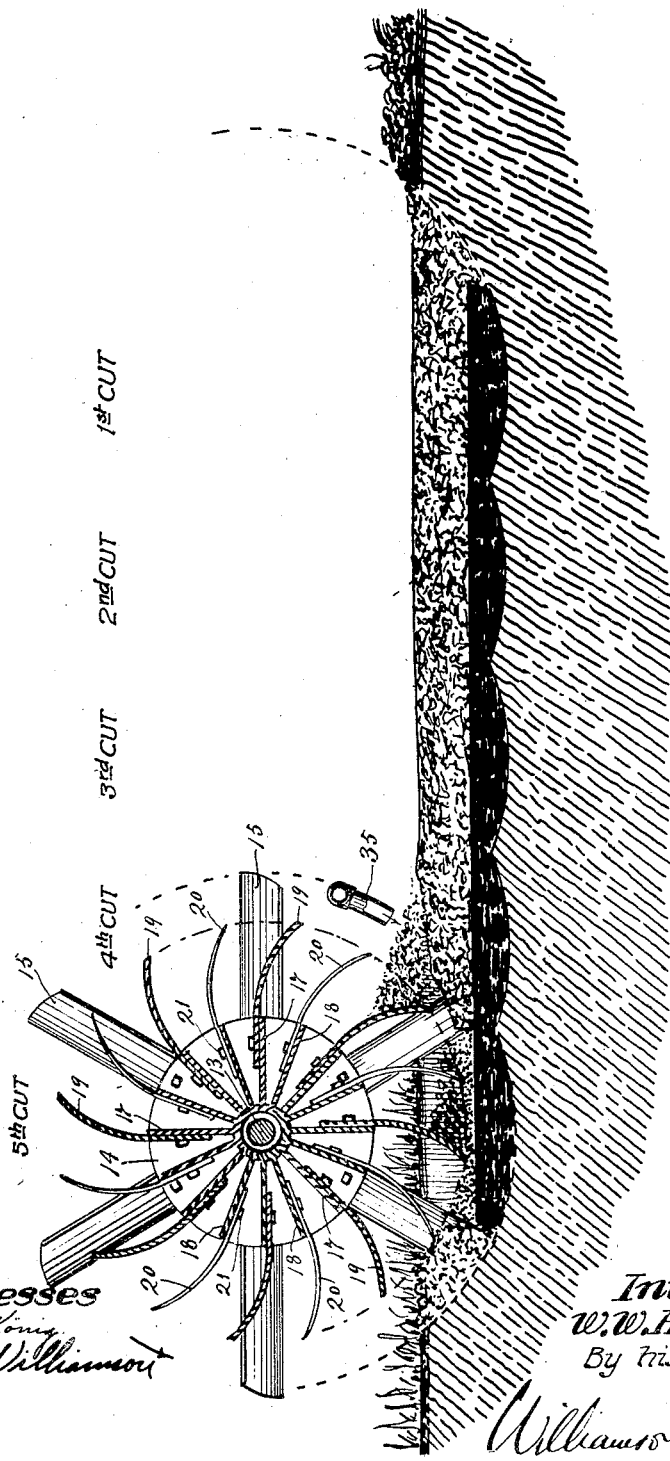

WALTER W. HARTSOUGH, OF MINNEAPOLIS, MINNESOTA.

MACHINE FOR PLOWING THE SOIL.

1,290,986.

Specification of Letters Patent.   Patented Jan. 14, 1919.

Application filed March 11, 1916.   Serial No. 83,500.

*To all whom it may concern:*

Be it known that I, WALTER W. HARTSOUGH, a citizen of the United States, residing at Minneapolis, in the county of Hennepin and State of Minnesota, have invented certain new and useful Improvements in Machines for Plowing the Soil; and I do hereby declare the following to be a full, clear, and exact description of the invention, such as will enable others skilled in the art to which it appertains to make and use the same.

My invention has for its object to provide an improved machine for plowing or tilling the soil; and to such ends, consists of the novel devices and combinations of devices hereinafter described and defined in the claims.

In most agricultural districts, the rich humus containing top soil will be found to vary in depth from four to eight inches, the greater depth being rather exceptional, and for the purposes of this discussion, we may assume the average depth thereof, to be six inches. Under these conditions, it is customary to plow a furrow not more than five inches in depth. The stratum of subsoil below the top or black soil is sometimes a hard pan clay, sometimes gravel or sand, and sometimes a mixture thereof, and if plowed up or turned to the top of the soil, would destroy or greatly damage the same for agricultural purposes. Nevertheless, deep plowing or tilling, and to a depth greater than the depth of the top soil, is essential to the best crop productions.

It is a known fact that the roots of most plants will not penetrate the hard substratum below the bottom of the plowed furrow, but will spread rather and grow laterally. Deep rooting is desirable because the deep roots have access to a better or more steady supply of moisture than roots closer to the surface. Also, water from rain and melting snows will not as readily penetrate the under stratum or subsoil when it is hard, as it will when loosened up or plowed, and furthermore, it is desirable that the soil be loosened up and aereated to as great a depth as practicable.

An ordinary mold board plow produces a very hard or glazed surface at the bottom of the furrow, known as "plowpan" and through which neither the roots of plants nor moisture readily pass. My invention also removes this objectionable feature.

My invention, both as to process and apparatus or machine, has resulted from careful consideration of the above stated facts and conditions.

In accordance with the process, as the first step or operation, the soil is broken up and loosened to a considerable depth, say to a depth of five inches below the assumed depth to which the top or black soil is to be displaced. By this first step or operation the subsoil stratum is not displaced vertically, but is disintegrated and opened up so that air has access thereto, and is preferably, and in the same operation is displaced slightly in a horizontal direction. As a second step of the process, the upper stratum or top soil, to the depth of five inches, is further disintegrated and pulverized or broken up, and is removed or displaced to one side of the furrow, and onto the surface of the subsoil stratum of the previously formed furrow. Preferably, as a third step of the operation, the upper surface of the loosened subsoil stratum of the furrow is slightly packed, and the three operations above noted are carried out by continuous or synchronous operations. The pulverized top soil thus removed from the furrow immediately being formed, will be deposited upon the somewhat packed upper surface of the subsoil stratum of the furrow just previously formed. The packing of the upper surface of the subsoil stratum does not by any means press the same back to its original compactness, but simply presses in the larger air cavities and prevents undue subsequent settling, and furthermore, reëstablishes that contact with the lower soil required for good capillary attraction of the moisture. Soil plowed as above described will have a pulverized smooth surface which will serve as a dust blanket to conserve the moisture in the soil.

The process above outlined may, in fact, be performed by hand operations, or by the use of hand operated tools, but to carry the same out economically on a commercial scale requires a specially designed apparatus or machine, and this preferred form of this machine, which involves various novel devices and combinations of devices, is illustrated in the accompanying drawings wherein like characters indicate like parts throughout the several views.

Referring to the drawings:

Figure 1 is a plan view of the improved machine;

Fig. 2 is a side elevation of the same, illustrating the plowing action thereof;

Fig. 3 is an enlarged transverse section taken approximately on the line $x^3$ $x^3$ of Fig. 1, and illustrating the actions of the subsoil and top soil plowing devices;

Figs. 4 and 5 are cross sections taken through the furrow and illustrating the manner in which the same is formed; and Fig. 6 is a view corresponding to Fig. 3, but further illustrating the manner in which the successive furrows are formed.

The plow frame illustrated, comprises a main frame 1 and skeleton and trussed supplemental frame 2, the latter being pivoted to the front bars of the former at $1^a$ and projecting forward thereof. The main frame 1 is supported by a centrally located wide faced traction wheel 3 suitably journaled thereto, and provided with a large annular internal gear 4. The front end portion of the supplemental frame 2 is carried by steering wheels 5 that are journaled on stub axles 6 pivoted to the supplemental frame 2 and provided with arms 7 connected by a cross steering link 8 for imparting parallel steering movements to the said two wheels in a well known way. The forwardly projecting portions of the side bars of the frame 1 are provided with gear segments 9 that engage pinions 10 on a cross shaft 11 journaled in the side bars of the supplemental frame 2. Ratchet dogs 11 are pivoted to the side bars of said supplemental frame 2 and engage the pinions 10 to hold the same, and hence, the segments 9 in different adjustments. At one end, the shaft 11 is provided with an operating crank 12 by means of which it may be rotated to cause the pinions and segments to raise and lower the front portion of the main frame 1.

Located centrally in front of the traction wheel 3 with its axis extended longitudinally, or from front toward the rear of the machine, is a heavy spindle or shaft 13 journaled in suitable bearings on the main frame 1. This spindle carries two so-called plow wheels which, for distinction, may be designated as primary and secondary plow wheels. The primary plow wheel, as shown, comprises a heavy disk-like plate 14 and propeller-like blades 15, the latter of which project radially outward, far beyond the former.

The secondary plow wheel, as shown, comprises laterally spaced disk-like plates 16 having radial webs 17 and 18, to which shovels and forks 19 and 20, respectively, are rigidly attached, but preferably with connections, such as bolts and slots 21 that permit radial adjustments of the said members 19 and 20. The said shovels and forks, it will be noted, are alternated in a circumferential direction and are curved or bent slightly backward, in respect to the direction of rotation of the plow wheel (see particularly Figs. 3 and 6). The blades of the primary wheel project radially outward much farther than do the shovels and forks of the secondary wheel, say, for illustration, five inches. To the rear plate 16 of the secondary plow wheel is rigidly secured an internal ring gear 22.

On the main frame of the tractor is anchored an internal combustion engine indicated, as an entirety, by the numeral 23. To counterbalance the weight of the plow wheels and other parts, and for other reasons, this engine is preferably applied on the main frame 1 at the rear of the traction wheel 3. This engine or motor furnishes power for driving the primary and secondary plow wheels and also the traction wheel. Connections for accomplishing these results may be varied, but, as illustrated and briefly described, they are as follows. The crank shaft of the engine carries a spur pinion 24 and a sprocket 25. The pinion 24 meshes with a spur gear 26 on the rear end of a longitudinal shaft 27 journaled in suitable bearings on the main frame 1 and provided at its front end with a pinion 28 that meshes with the ring gear 22, and thereby transmits common rotary motion to the primary and secondary plow wheel.

A sprocket chain 29 runs over the sprocket 25 and over a sprocket 30 on the rear end of a counter shaft 31 journaled in suitable bearings on the frame 1 and connected by beveled gears 32 and reversible variable speed transmission gears 33, with a pinion 34 that meshes with the internal gear 4 of the traction wheel 3, and thereby transmits motion to the said traction wheel in the usual or any suitable well known manner, not necessary for the purposes of this case to further consider.

The exhaust port of the engine 23 is connected to the rear end of an exhaust pipe 35 that is suitably supported from the main frame 1 with its front end terminating in position to discharge the hot products of combustion directly against the loose earth as it is being lifted by the shovels and forks of the secondary plow wheel. The hot gases or products of combustion from the engine exhaust are thus utilized as a means for destroying destructive insects and noxious plants, such as witch grass, for example.

Under the forward movement of the machine, the primary and secondary plow wheels will be rotated in a direction reverse to the movements of the hands of a clock when viewed by the driver from the rear seat, and under this direction of rotation the oblique blades of the primary wheel will cut through the rich top soil and well down into the subsoil stratum and will cut up and loosen the dirt and give the same a slight rearward displacement without, however, to any appreciable extent, displacing or moving the soil vertically. In the earlier part of this description, it was assumed that the primary plow wheel cut through the soil to a depth of ten inches and that the secondary wheel dug into the top soil to a depth of five inches, and for the purposes of this case, these conditions will still be assumed to exist, although it will, of course, be understood that the depths of these cuts may be varied at will. Under the assumed conditions, the top soil under the action of the shovel blades 19 and forks 20, will be further disintegrated, and under favorable soil conditions, will be pulverized and forced or shoveled to one side of the furrow that is immediately being formed, and after the first furrow has been formed, will always be deposited upon the slightly packed surface of the subsoil of the furrow just previously formed.

Fig. 3 illustrates the formation of the first furrow, and Fig. 4 shows the condition of the first furrow before the second furrow has been formed. Fig. 5 illustrates the conditions of the soil after a second furrow has been formed, and by reference to these views, it will be noted that the furrow proper is but slightly wider than the face of the traction wheel 5, and that the furrows are formed by intersecting segmental cuts. This intersection of the segmental cuts is also important because it causes the disintegrated soil to be intersected several times by both the primary and secondary plow wheels which greatly facilitates fine disintegration of the soil, and particularly, of the transferred top soil. Fig. 6 shows the condition of the soil on the five inch cut, or while the five inch furrow is being plowed. Under the plowing action, the top surface of the plowed top soil is left very smooth and even and with a sort of a dust blanket exposed to the air. Such dust blanket, as is well known, is very much desired where conservation of moisture is desired and is on the most approved line of so-called "dry farming." Under some conditions, however, it may be desirable to slightly pack the upper surface of the soil and when this is so, the right hand front wheel 5 may have a wide face of extension, such as indicated by the dotted lines marked thereon in Fig. 2.

What I claim is:

1. A plowing machine comprising means for breaking and loosening up the soil to a considerable depth without displacing the same vertically, and means for thereafter disintegrating the upper portion only of the soil thus loosened up and depositing the same at one side of the furrow or into the furrow previously formed.

2. A plowing machine comprising means for breaking and loosening up the soil to a considerable depth and for displacing the same toward the rear of the machine, but without displacing the same vertically, and means for further disintegrating the upper portion of the soil thus loosened up and for depositing the same at one side of the furrow or into a furrow previously formed.

3. In a plowing machine, the combination with a supporting truck, of primary and secondary bladed-equipped rotary plow wheels, both rotatable transversely of the truck, said primary wheel being located ahead of said secondary wheel and arranged to disintegrate and break up the soil to a much greater depth than said secondary wheel, the latter comprising means serving to further disintegrate the upper top soil and to deposit the same at one side of the furrow being formed or into a furrow previously formed.

4. In a plowing machine, the combination with a supporting truck, of a propeller bladed primary plow wheel, and a shovel bladed secondary plow wheel, both rotatable transversely of the truck and in a direction to cause the blades of the former to assist in impelling the machine forward, the said primary wheel being arranged to cut a much greater depth than said secondary wheel and the latter serving to further disintegrate the top soil and to deposit the same at one side of the furrow being formed or into a furrow previously formed.

5. In a plowing machine, the combination with a supporting truck, of a propeller bladed primary plow wheel, and a shovel bladed secondary plow wheel, both rotatable transversely of the truck and in a direction to cause the blades of the former to assist in impelling the machine forward, the said primary wheel being arranged to cut a much greater depth than said secondary wheel and the latter serving to further disintegrate the top soil and to deposit the same at one side of the furrow being formed or into a furrow previously formed, said secondary wheel having disintegrating forks located between its blades.

6. In a plowing machine, the combination with a supporting truck, of a propeller bladed primary plow wheel, and a shovel bladed secondary plow wheel, both rotatable transversely of the truck and in a direction to cause the blade of the former to assist in impelling the machine forward, the said primary wheel being arranged to cut a much greater depth than said secondary wheel and the latter serving to further disintegrate the top soil and to deposit the same at one side of the furrow being formed or into a furrow previously formed; the blades of one of said plowing wheels being radially adjustable to vary the relative depth of cut.

7. In a plowing machine, the combination with a supporting truck, of a propeller bladed primary plow wheel, and a shovel bladed secondary plow wheel, both rotatable transversely of the truck and in a direction to cause the blades of the former to assist in impelling the machine forward, the said primary wheel being arranged to cut a much greater depth than said secondary wheel and the latter serving to further disintegrate the top soil and to deposit the same at one side of the furrow being formed or into a furrow previously formed, the blades of said secondary wheel being radially adjustable to vary the relative depth of cut in respect to said primary wheel.

8. In a plowing machine, the combination with a carrying truck and a motor thereon, of a propeller bladed primary plow wheel and a shovel bladed secondary plow wheel, and a longitudinally extended motor driven shaft to which both of said plow wheels are secured, said primary plow wheel being arranged to cut to a much greater depth than said secondary plow wheel and comprising means to assist in impelling the machine forward.

9. In a plowing machine, the combination with a carrying truck and a motor thereon, of a propeller bladed primary plow wheel and a shovel bladed secondary plow wheel, and a longitudinally extended motor driven shaft to which both of said plow wheels are secured, said primary plow wheel being arranged to cut to a much greater depth than said secondary plow wheel and comprising means to assist in impelling the machine forward, and independent transmission mechanism between said motor and one of the wheels of said truck.

10. In a plowing machine, the combination with a main truck frame having a centrally located traction wheel, of a supplemental frame pivoted to and projecting forward of said main frame, means for locking said frames on their pivotal connection to thereby raise and lower the front portion of said main frame, steering wheels supporting said supplemental frame, primary and secondary plow wheels mounted on the front portion of said main frame and rotatable transversely thereof, and a motor on said truck frame having connections for rotating said plow wheels and for driving said traction wheel.

In testimony whereof I affix my signature in presence of two witnesses.

WALTER W. HARTSOUGH.

Witnesses:
 BERNICE G. WHEELER,
 HARRY D. KILGORE.